US012192386B2

(12) United States Patent
Cohler

(10) Patent No.: US 12,192,386 B2
(45) Date of Patent: Jan. 7, 2025

(54) SYSTEMS AND METHODS FOR FACILITATING BLOCKCHAIN OPERATIONS BASED ON NETWORK CONGESTION

(71) Applicant: Coinbase, Inc., Oakland, CA (US)

(72) Inventor: Yuga Cohler, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 334 days.

(21) Appl. No.: 17/699,859

(22) Filed: Mar. 21, 2022

(65) Prior Publication Data

US 2023/0299983 A1 Sep. 21, 2023

(51) Int. Cl.
*H04L 9/00* (2022.01)
*H04L 9/32* (2006.01)
*H04L 47/12* (2022.01)
*H04L 67/1097* (2022.01)

(52) U.S. Cl.
CPC ............. *H04L 9/50* (2022.05); *H04L 9/3247* (2013.01); *H04L 47/12* (2013.01); *H04L 67/1097* (2013.01); *H04L 2209/56* (2013.01)

(58) Field of Classification Search
CPC ......... H04L 9/50; H04L 9/3247; H04L 47/12; H04L 67/1097
USPC ........................................................ 713/189
See application file for complete search history.

(56) References Cited

U.S. PATENT DOCUMENTS

| | | | |
|---|---|---|---|
| 2020/0243205 A1* | 7/2020 | Sharma | G06F 16/137 |
| 2021/0049306 A1* | 2/2021 | Yang | H04L 9/50 |
| 2021/0328770 A1* | 10/2021 | Gaur | H04L 9/0637 |

* cited by examiner

*Primary Examiner* — Kambiz Zand
*Assistant Examiner* — Phuc Pham
(74) *Attorney, Agent, or Firm* — Foley & Lardner LLP

(57) ABSTRACT

Methods and systems are described for facilitating blockchain operations based on network congestion. The system may facilitate blockchain operations by generating recommendations for blockchain operations based on values for one or more blockchain operation characteristics that are determined based on a likelihood that a given blockchain operation will be completed in a timely manner. The system thus ensures accounts for transient congestion in a blockchain network, while also minimizing a burden on a user device attempting to perform a blockchain operation.

20 Claims, 7 Drawing Sheets

600

Average Gas Savings (gwei)

Fig 1. Average gas savings from EIP-1559 transaction in gwei

650

P50 Confirmation Time Delta (s)

Fig 2. P50 broadcast-to-confirmation time delta between EIP-1559 and legacy transactions in seconds

SYSTEMS AND METHODS FOR FACILITATING BLOCKCHAIN OPERATIONS BASED ON NETWORK CONGESTION

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. As one example, methods and systems are described herein for novel uses and/or improvements to blockchains and blockchain technology that use a proof-of-stake consensus mechanism.

Proof-of-stake is a type of consensus mechanism that may be used by a blockchain network to achieve distributed consensus and thus avoid a centralized authority. The benefits of proof-of-stake (e.g., as compared to a proof-of-work consensus mechanism) includes better energy efficiency and lower barriers of entry, which may lead to a larger overall node network (as mining blocks is both less costly due to energy efficiency and does not require specialized hardware). For example, unlike a proof-of-work consensus mechanism, the blockchain network does not rely on mining new blocks based on exercising significant amounts of computational power. Instead, validators for the proof-of-stake consensus mechanism are chosen at random based on meeting a threshold staking requirement. Validators then receive rewards for proposing new blocks and for attesting to ones that they have viewed. In contrast, validators may lose their stake for attesting to incorrect or malicious blocks.

Within this context, conventional proof-of-stake consensus mechanisms rely on a first-price auction as main gas fee calculation methodology. For example, in first-price auctions, users may set an amount of gas that the user will pay to have their blockchain operation processed. In such cases, the users with the highest amounts will have their blockchain operations processed first (as the validators chose the blockchain operations with the highest gas fee, which in turn became their reward). In contrast to this, methods and systems described herein relate to a new gas fee calculation (e.g., based on a new blockchain operation type) that may allot a dynamic "base fee," which is burned, and an additional fee that is allocated to the validator. While the new gas fee calculation may make the gas fee calculation more transparent and may allow for gas fees to be better estimated, implementation of the new gas fee calculation presents several technical challenges. For example, Ethereum Improvement Proposal (EIP) 1559 will introduce a new blockchain operation type (e.g., a transaction based on a new EIP-2718 transaction envelope type). The EIP-2718 transaction envelope type allows for the use of transaction pricing mechanism that includes fixed-per-block portion of the network fee (e.g., the base fee) that is burned and dynamically expands/contracts block sizes to deal with transient congestion as opposed to the first-price action.

While EIP-1559 may provide improved congestion management, the use of EIP-1559 introduces a new technical problem as it requires users to determine both dynamic blockchain characteristics (e.g., blockchain characteristics based on a current state of a network) and static blockchain characteristics (e.g., user and/or system selected blockchain characteristics) for a blockchain operation. Depending on the blockchain characteristics, a blockchain operation may or may not fail. Even if a blockchain operation is successfully completed, the blockchain operation's completion may be delayed such that it is recorded after one or more blocks are added to the blockchain network. Such delays are not ideal and may contribute to subsequent downstream failures of systems that rely on reliable and timely completion of blockchain operations. To further add to the technical challenges introduced by EIP-1559, there is no minimum set of blockchain characteristics that may guarantee that a blockchain operation may be completed within one block (or other number of blocks). As such, EIP-1559 introduces uncertainty not only in whether or not a blockchain operation will be completed (and completed in a timely manner), but also what blockchain operation characteristics should be used to maximize the likelihood of completion in a timely manner.

In view of this, methods and systems are described herein facilitating blockchain operations based on network congestion. In particular, the system may facilitate blockchain operations by generating recommendations for blockchain operations based on values for one or more blockchain operation characteristics that are determined based on a likelihood that a given blockchain operation will be completed in a timely manner. By doing so, the system accounts for transient congestion in a blockchain network, while also minimizing a burden on a user device attempting to perform a blockchain operation. The system achieves this by generating a representation that indicates a probability of completion of a given blockchain operation within one block as a function of values for a static blockchain operation characteristic. For example, the system generates the function of values based on respective values of the static blockchain operation characteristic for completed and uncompleted (e.g., failed) blockchain operations over a given time period.

The system may then receive a user request comprising a requested percentile of the probability of completion for a given blockchain operation. In response the system provides a value for the blockchain operation that achieves the percentile. The system may then generate a recommendation for a blockchain operation based on the value, which may comprise generating a dynamic gas range by combining a dynamic blockchain operation characteristic with the value for the static blockchain operation characteristic.

In some aspects, methods and systems are for facilitating blockchain operations based on network congestion. For example, the system may determine a first plurality of values for a first type of static blockchain operation characteristic, wherein each value of the first plurality of values for the first type of static blockchain operation characteristic corresponds to a respective blockchain operation of a first plurality of blockchain operations that was completed within one block of a blockchain network during a first time period. The system may determine a second plurality of values for the first type of static blockchain operation characteristic, wherein each value of the second plurality of values for the first type of static blockchain operation characteristic corresponds to a respective blockchain operation of a second plurality of blockchain operations that was not completed within one block of the blockchain network during the first time period. The system may, based on the first plurality of values and the second plurality of values, determine a first representation, wherein the first representation of a probability of completion of a given blockchain operation within one block is a function of values for the first static blockchain operation characteristic. The system may receive a user request to perform a blockchain operation. The system may determine a first requested percentile for the probability of completion. The system may determine, based on the first representation, a first value for the first static blockchain operation characteristic based on the first requested percentile. The system may generate for display, on a user interface, a first recommendation for the blockchain operation based on the first value.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
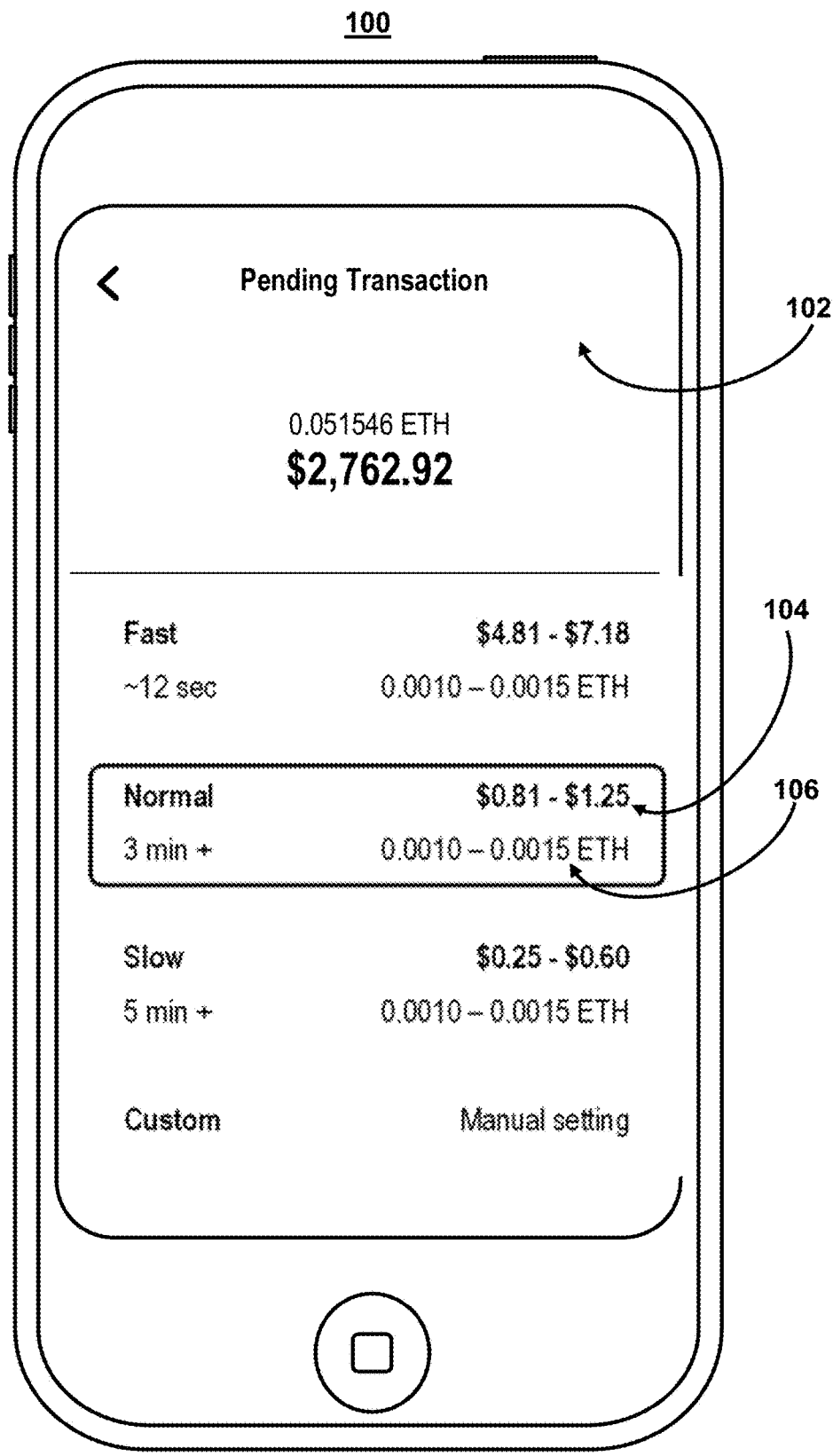
FIG. 1 shows an illustrative diagram of a user device for performing blockchain operations, in accordance with one or more embodiments.

FIG. 1 shows an illustrative diagram of a user device for performing blockchain operations, in accordance with one or more embodiments. For example, FIG. 1 shows user interface 100, which may comprise a decentralized application browser used for conducting blockchain operations linked to a cryptography-based storage application. For example, the decentralized application browser may receive user requests for performing a plurality of blockchain operations across a computer network. In some embodiments, an application programming interface (API) implemented on a user device may receive a user request (e.g., from the decentralized application browser) to perform the blockchain operation. As referred to herein, a cryptography-based digital repository or "a cryptography-based storage application" may refer to a digital wallet. A digital wallet may comprise a software-based system that securely (and typically in an encrypted format) stores a user's confidential information, personal information, payment information, and/or passwords for numerous payment methods and websites. By using a digital wallet, users can complete communications, purchases, and/or other blockchain operations easily and securely without risking the information becoming public or subject to a cyberattack. In some embodiments, user interface 100 may illustrate an open connection between a client (mobile or extension) and a decentralized application.

User interface 100 currently shows blockchain operation 102 (e.g., a pending blockchain operation). As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

For example, before EIP-1559, each blockchain operation (e.g., on the Ethereum network) had a GasPrice set on the blockchain operation. In some blockchain standards, blockchain nodes picked the highest GasPrice transactions to include in the next block. The entire GasPrice was paid directly to the miner, in which GasPaid=GasPrice*GasLimit. For a legacy blockchain operation on EIP-1559 enabled blockchain (e.g., using a first-price auction), a dynamic blockchain operation characteristic (e.g., a base fee) is required to be included in a block, which is burned by the blockchain network. The system then provides the remainder that is not burned to miners. For EIP-1559 blockchain operations, each blockchain operation includes a MaxFeePerGas and MaxPriorityFeePerGas. The MaxFeePerGas represents the highest base fee a user is willing to pay to have their transaction mined. The MaxPriorityFee is the maximum amount of the MaxFee that the user is willing to "tip" to miners (assuming it is not all consumed by the base fee). The actual executing gas price is dynamically decided with the following formula, and any excess is returned to the user. GasPaid=Math.min((BaseFee+MaxPriorityFeePerGas)*GasLimit, MaxFeePerGas*GasLimit).

Each blockchain operation may include static blockchain operation characteristics and dynamic blockchain operation characteristics. The system may process the blockchain operation based on the one or more static blockchain operation characteristics and dynamic blockchain operation characteristics.

Static blockchain operation characteristics may comprise characteristics for blockchain operations that do not depend on the current state of the blockchain network. As referred to herein, "a static blockchain operation characteristic" may comprise data or values that are set by a user (e.g., via user interface 100) or by a user device (e.g., based on programming logic for a decentralized application). Static blockchain operations may include blockchain operation user data (e.g., data representing an action from a user including a transfer of funds), a miner fee or priority fee (e.g., the fee required to process a transaction on the blockchain), a maximum priority fee (e.g., a maximum amount of "miner tip" per gas the user is willing to pay directly to the miner for processing the transaction), a user inputted gas limit (e.g., maximum amount of gas units a transaction is allowed to consume), and/or a max fee (e.g., a maximum amount fee per gas user is willing to pay for a transaction, which must be larger than the base fee for the transaction to go through). For example, the system may leverage transaction histories to dynamically compute an appropriate max_priority_fee_per_gas_based on network conditions.

Notably, the proper selection of static blockchain operation characteristics may determine whether or not a blockchain operation is successful. For example, depending on the blockchain characteristics, a blockchain operation may or may not fail. Even if a blockchain operation is successfully completed, the blockchain operation's completion may be delayed such that it is recorded after one or more blocks are added to the blockchain network. Such delays are not ideal and may contribute to subsequent downstream failures of systems that rely on reliable and timely completion of blockchain operations. To further add to the technical challenges introduced by EIP-1559, there is no minimum set of blockchain characteristics that may guarantee that a blockchain operation may be completed within one block (or other number of blocks). As such, EIP-1559 introduces uncertainty not only in whether or not a blockchain operation will be completed (and completed in a timely manner), but also what blockchain operation characteristics should be used to maximize the likelihood of completion in a timely manner. Therefore, a critical technical challenge is to select a proper value for the static blockchain operation characteristic.

As referred to herein, "a dynamic blockchain operation characteristic" may comprise a characteristic that is dependent on the current state of the blockchain network. For example, a dynamic blockchain operation characteristic may comprise a gas limit for a block on the blockchain (e.g., a maximum amount of gas units allowed in an entire block) and a base fee (e.g., a minimum amount fee per gas unit needed to include a new transaction in a block, which may be set by a protocol algorithmically). One example of a dynamic blockchain operation characteristic is a base fee. As referred to herein, a "base fee" refers to an amount of cryptocurrency (or other digital asset) that the blockchain burns in order to process a blockchain operation on the blockchain. For example, a base fee may be a minimum amount fee per gas unit needed to include a new blockchain operation in a block. Before EIP-1559, a blockchain network could not enforce a base fee and all miner fees went to the miner. However, with EIP-1559, most fees are burned and the miner is typically left with a very small remainder. The base fee is used to reach an equilibrium with market demand. By doing so, the system may provide a mechanism that is deflationary for ETH and ensures miners cannot opt into non-ETH compensation for blockchain operations (e.g., "gasless transactions").

In some embodiments, the system may determine a dynamic gas range based on one or more static blockchain operation characteristics and/or dynamic blockchain operation characteristics. For example, the system may generate a recommendation (e.g., recommendation 104) that comprises a dynamic gas range for conducting a blockchain operation (e.g., blockchain operation 102) based on one or more blockchain operation characteristics. For example, user interface 100 may show a dynamic gas range, which is based on a base fee (e.g., a dynamic blockchain operation characteristic) and priority designation (e.g., a static blockchain operation characteristic). Furthermore, the system may automatically select a value for the priority designation that is attributed to a miner's fee.

For example, as shown in FIG. 1, the system may offer one or more priority designations as part of one or more blockchain operation processing recommendations (e.g., recommendation 104). In some embodiments, the priority designation may include static blockchain operation characteristics based on a decentralized application setting for a priority fee. For example, the system may determine several values (e.g., corresponding to various priority designations). The system may then use these values to generate the plurality of blockchain operation processing recommendations that correspond to various priorities. Alternatively or additionally, the system may allow a user to enter a custom setting.

For example, the system may monitor network conditions for a blockchain network. The system may retrieve values (e.g., indicating network congestion, current gas limits per block, etc.). The system may then compare the current blockchain operation characteristics to the retrieved values (or confidence thresholds based on the retrieved values). For example, the system may generate one or more thresholds (e.g., a threshold corresponding to a given likelihood that a blockchain operation will be completed with the current blockchain operation characteristics). In response to determining that the thresholds are not met, the system may generate a blockchain operation processing recommendation (e.g., a warning, error, etc.). In some embodiments, the blockchain operation processing recommendation may also include recommendations for blockchain operation characteristics or values thereof to meet a given threshold.

The retrieved values may correspond to a given probability of completion for a blockchain operation. For example, the system may determine a percentile for the probability of completion that corresponds to a given priority designation. The system may then determine a value (e.g., a miner's fee) that corresponds to the percentile. Additionally or alternatively, a user or the system may select a number of blocks within which the blockchain operation must be completed (e.g., a default setting may be one block). By doing so, the system may allow users flexibility in values of blockchain operation characteristics for less urgent blockchain operations.

In some embodiments, the system may use an artificial intelligence or machine learning model (e.g., referred to herein collectively as "model") to determine a probability of completion and/or a value for a blockchain characteristic (e.g., a miner's fee). For example, the determination may be an output shown on a user device and/or an output sent to another system component.

For example, a model may take inputs and provide outputs. The inputs may include multiple data sets, such as a training data set and a test data set. This training data may comprise a labeled training data pulled from an indexing application that indicates a miner's fee corresponding to previously completed (or failed) transactions. Based on the miner's fee, the system may determine an optimal miner's fee for attributing to a given blockchain operation to ensure its completion (e.g., within a percentile of probability).

In some embodiments, the training data set and test data set may be divided from a set of available and/or historical data. The split may be 60-80% training data and 20-40% testing data (e.g., for in-time validation). For example, the system may adjust the split based on numerous factors. For example, the test data set is used by the system to measure the performance in a real scenario on unseen data. Accordingly, the system may modify the split based on how much is needed for an accurate measurement, which further depends on the level of accuracy needed and the amount of variance expected. In some instances, if the total amount of training data is low, the system may reduce or increase the amount of training data in the split.

In one use case, outputs may be fed back to a model as input to train the model (e.g., alone or in conjunction with user indications of the accuracy of outputs, labels associated with the inputs, or with other reference feedback information). In another use cases, a model may update its configurations (e.g., weights, biases, or other parameters) based on its assessment of its prediction (e.g., outputs) and reference feedback information (e.g., user indication of accuracy, reference labels, or other information). In another use case, where a model is a neural network, connection weights may be adjusted to reconcile differences between the neural network's prediction and the reference feedback. In a further use case, one or more neurons (or nodes) of the neural network may require that their respective errors be sent backward through the neural network to them in order to facilitate the update process (e.g., backpropagation of error). Updates to the connection weights may, for example, be reflective of the magnitude of error propagated backward after a forward pass has been completed. In this way, for example, the model may be trained to generate better predictions (e.g., recommendations).

In some embodiments, in order to provide this, the system may use an individual data point and an XGBoost algorithm to generate real time predictions of the solution of a linear programming optimization. The system may first pull a full set of historical blockchain data and run linear programming solving on it to determine the optimal value for a given blockchain characteristic (e.g., a minimum value of a miner's fee to ensure a given probability of completion). The system may then use a reversely built XGBoost model to predict the optimal value for each of the data points given certain predictors. The advantage of this is that the system may achieve real-time scoring of incoming data points without the need to collect a full set of blockchain data.

Figure 2:
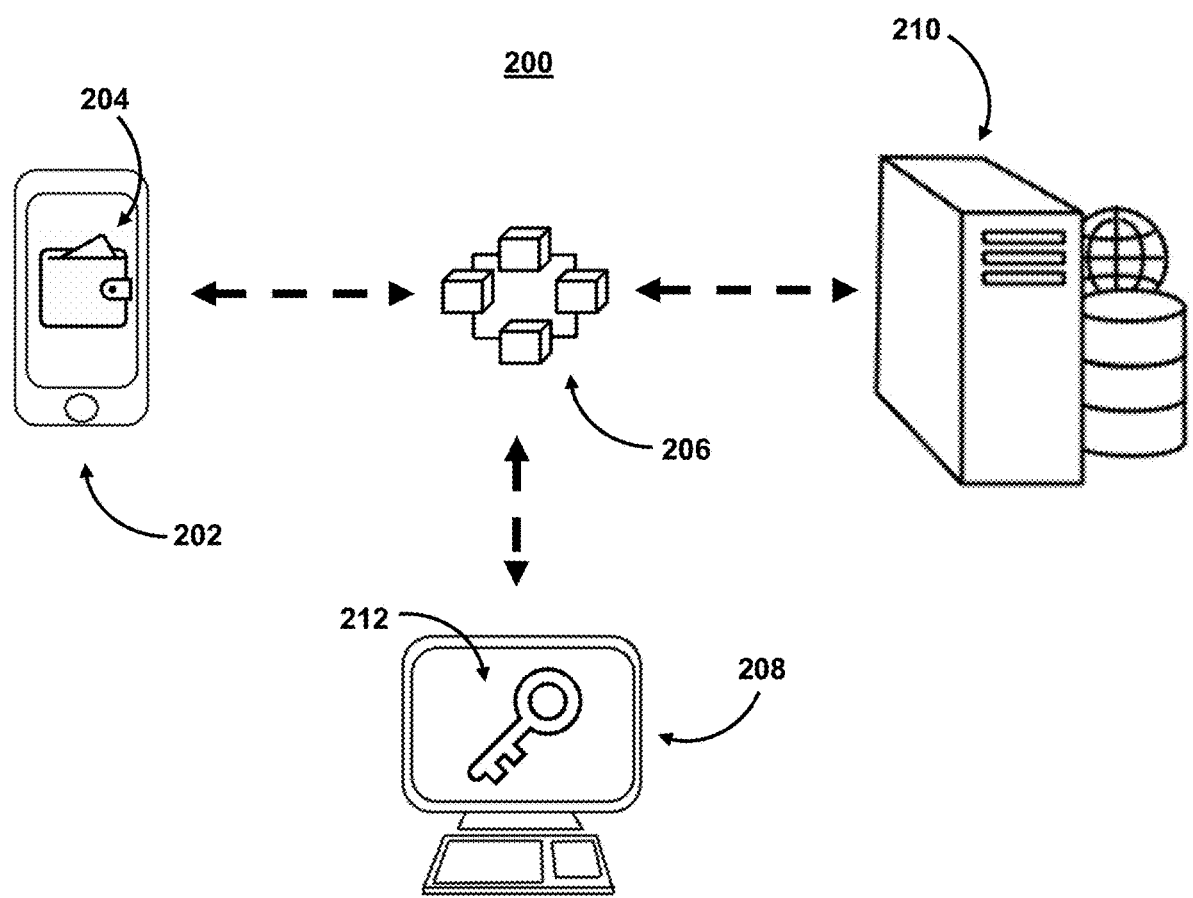
FIG. 2 shows an illustrative diagram for conducting blockchain operations, in accordance with one or more embodiments.

FIG. 2 shows an illustrative diagram for conducting blockchain operations, in accordance with one or more embodiments. For example, the present embodiment shows various components that may be used to facilitating blockchain operations in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to facilitate blockchain operations, and the user interface may display content related to blockchain operations. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances, but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to the features shown in FIG. 1. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as gas. As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet, while cold wallets are not. Most digital wallet holders hold both a hot wallet and a cold wallet. Hot wallets are most often used to perform blockchain operations, while a cold wallet is generally used for managing a user account and may have no connection to the Internet.

As shown in FIG. 2, one or more user devices may include a private key (e.g., key 212) and/or digital signature. For example, system 200 may use cryptographic systems for conducting blockchain operations such as shown in FIG. 1. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation, and thus, this mechanism provides a manner for achieving consensus in a decentralized manner, as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively, or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
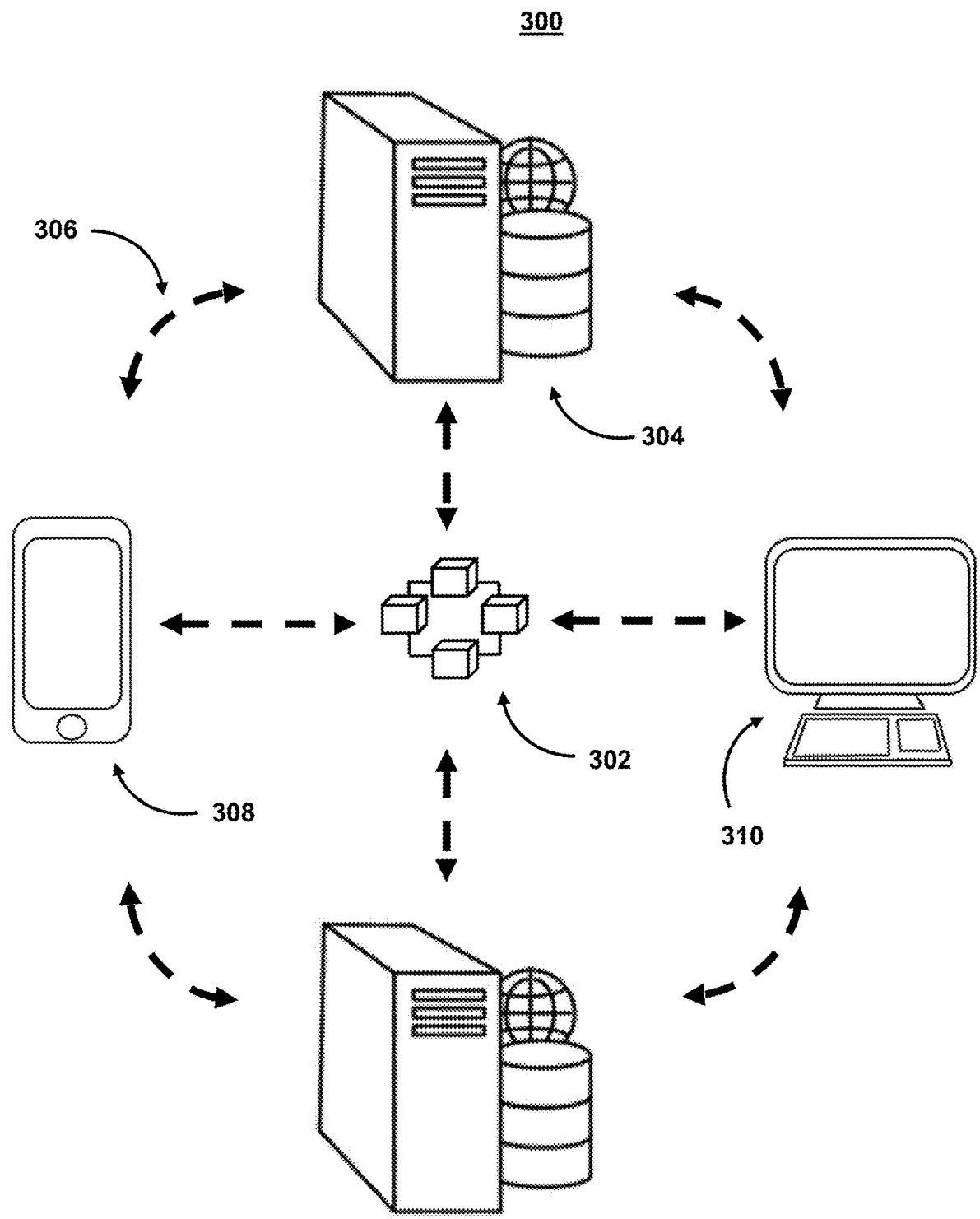
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may facilitate blockchain operations within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations). Additionally, the devices in system 300 may run an application (or another suitable program). The application may cause the processors and/or control circuitry to perform operations related to facilitating blockchain operations within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
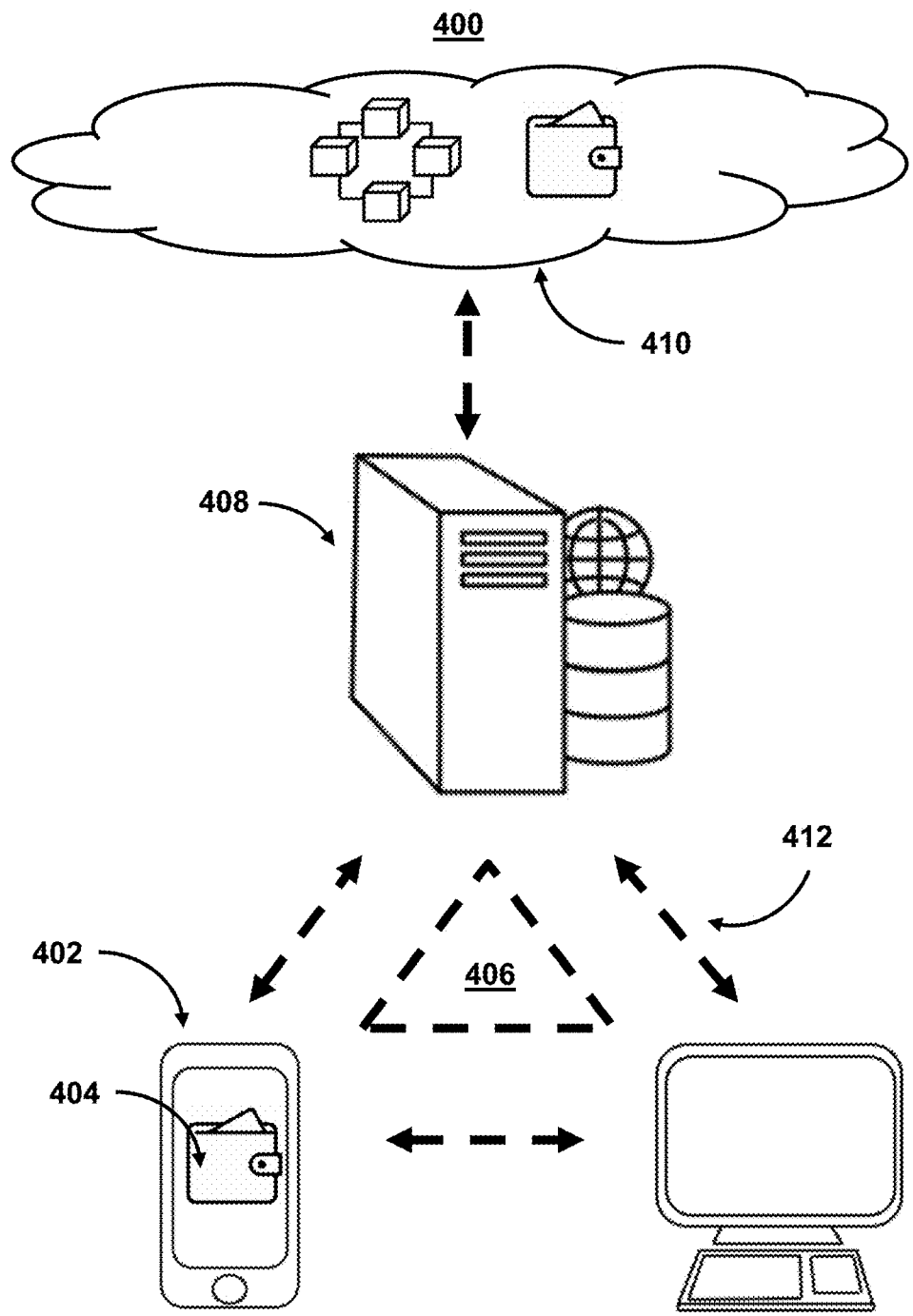
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or APIs in order to facilitate blockchain operations. For example, application 404 may comprise a decentralized application digital wallet and/or wallet service that is able to sign and send transactions to transfer tokens and/or perform other blockchain operations, as well as interact with one or more decentralized applications.

System 400 also includes API layer 406. In some embodiments, API layer 406 may be implemented on user device 402. Alternatively, or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate blockchain operations. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write the outcome of the reads to an additional ledger (e.g., an internal record and/or indexer service). If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information, such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services, as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers (e.g., API layer 406), services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints, applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user's account's position if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more application binary interfaces (ABIs). An ABI is an interface between two program modules, often between operating systems and user programs. ABIs may be specific to a blockchain protocol. For example, an ethereum virtual machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for bytecode to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, making translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information, such as function signatures and variable declarations in a format that the EVM can understand to call that function in bytecode. ABI encoding may be automated by the system using compilers or wallets interacting with the blockchain.

Figure 5:
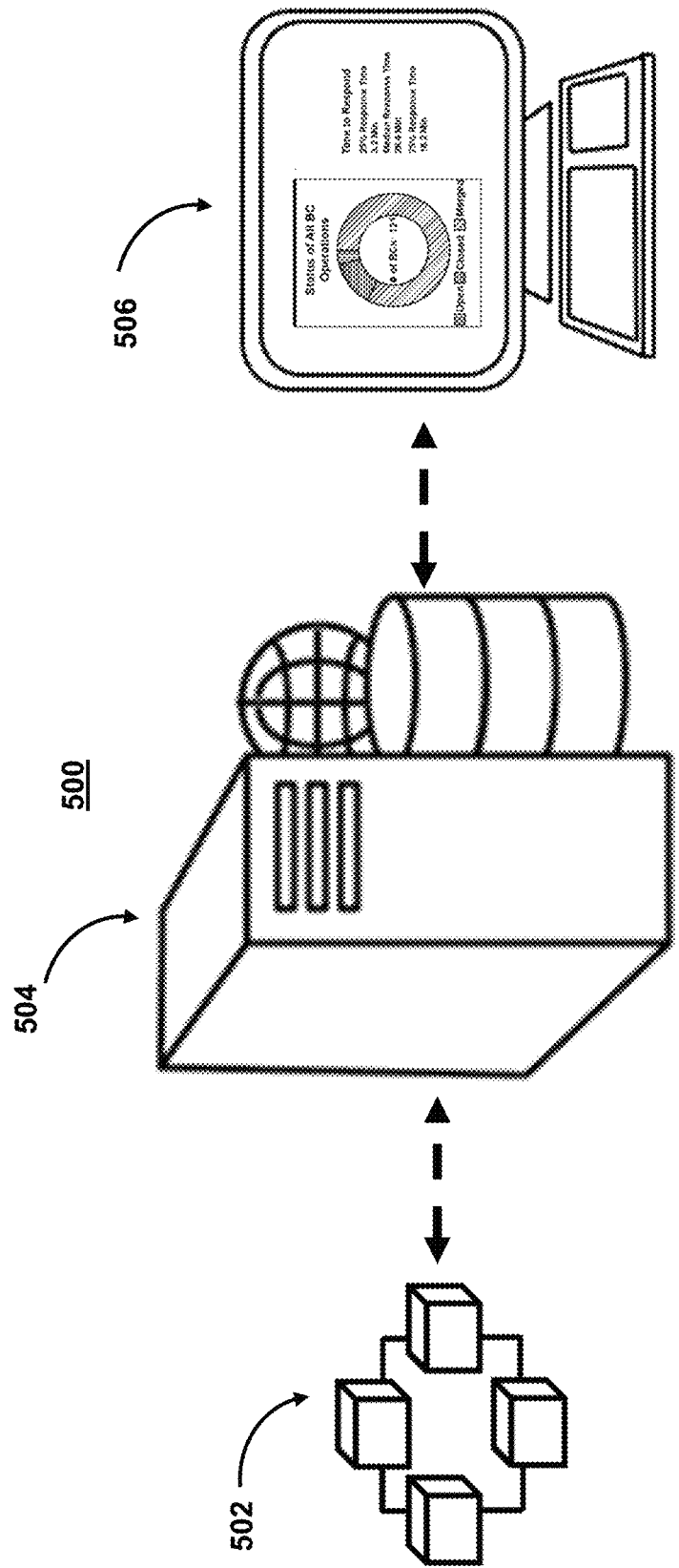
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to facilitate blockchain operations. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.), as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.), as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6A:
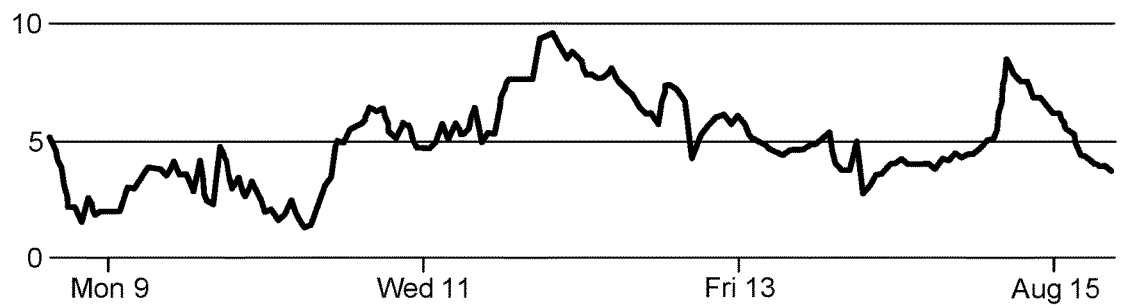
FIGS. 6A-6B show a diagram indicating the results of the system with respect to static blockchain operation characteristics, in accordance with one or more embodiments.
Figure 6B:
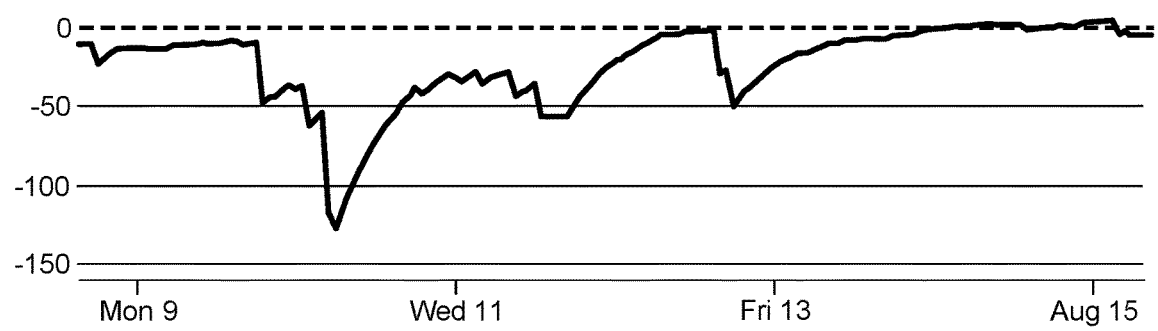

FIGS. 6A-6B show a diagram indicating the results of the system with respect to static blockchain operation characteristics, in accordance with one or more embodiments. For example, FIG. 6A includes chart 600 and FIG. 6B includes chart 650. Chart 600 indicates the average gas savings for blockchain operations when using the system to determine values for static blockchain operation characteristics. For example, in addition to demonstrating a rolling average gas savings over a historical time period (e.g., as shown in chart 600), the system also indicates an increase in a completion percentage of EIP-1599 transactions (as compared to legacy transactions) with determined values for static blockchain operation characteristics.

Diagram 650 illustrates blockchain operation confirmation percentile over a given time period (e.g., one week). For example, as shown in diagram 650, confirmation percentile for blockchain operations increased. For example, the system may collect blockchain operation characteristics in real-time and organize them into groups (e.g., based on whether or not a corresponding blockchain operation was completed). For example, the system may identify characteristics of particular blockchain operation characteristics (e.g., miner fees, network fees, base fees, etc.) and determine the actual confirmation of a respective blockchain operation over the time period. For example, the system may determine the actual confirmation of blockchain operations.

In some embodiments, the system may filter information or patterns using techniques involving collaboration among multiple agents, viewpoints, data sources, etc. That is, the system may make automatic predictions about the confirmation probability of a blockchain operation by collecting blockchain characteristics about previously completed (or failed) blockchain operations. The system may then generate a representation of the collected blockchain characteristics and information about whether or not a blockchain operation was completed. For example, the system may generate a probability rating, r, of a confirmation, c, of a blockchain operation, b, based on an aggregation of information on previous blockchain operations over a given time period:

$$r_{b,c} = \text{aggr}_{b' \in U} r_{b',c}$$

In such cases, where B denotes the set of top N blockchain operations that are most similar to a pending blockchain operation, u, who had a confirmation, c. Some examples of the aggregation function include:

$$r_{b,c} = \frac{1}{N} \sum_{b' \in U} r_{b',c}$$

$$r_{b,i} = k \sum_{b' \in B} (b, b') r_{b,c}$$

where k is a normalizing factor defined as:

$$k = 1 / \sum_{b' \in B} |(b, b')|$$

$$r_{b,c} = \underline{r_b} + k \sum_{b' \in B} (b, b')(r_{b',c} - \underline{r_{b'}})$$

where $r_{b'}$ is the average rating of blockchain operations, b, for all the blockchain operations rated by b. The neighborhood-based algorithm calculates the similarity between two blockchain operations, and the system may then produce a prediction for the blockchain operation by taking the weighted average of all the ratings. The system may then compare similarity between blockchain operations through the use of Pearson correlation and vector cosine.

Additionally or alternatively, the system may use a model based approach that uses one or more filtering models (e.g., including Bayesian networks, clustering models, latent semantic models such as singular value decomposition, probabilistic latent semantic analysis, multiple multiplicative factor, latent Dirichlet allocation, and/or Markov decision process based models). The system may also use latent models (e.g., dimensionally reduced versions of the model) in order to reduce the processing time and power required to cluster blockchain operations. For example, reducing the processing time and power required allows for the system to be used for generating real-time results and/or allowing the system to be run on a mobile device.

The system may use the memory-based algorithms, but as executed through one or more of the models described. The system may generate a representation based on confirmation percentile and blockchain operation characteristic-based similarities that indicate a correlation with confirmation percentile and other similarities. As such, the system may generate a representation for confirmation percentiles and blockchain operation characteristics, and use the representation to: identify a correlation between a confirmation percentile and blockchain operation characteristics; generate similar confirmation percentile for a given blockchain operation (or blockchain operation characteristic); and/or determine a number of available blockchain operations for target confirmation percentile.

The system may then derive a statistical distribution of observed real-time confirmation percentile for each group (e.g., blockchain operations having specific blockchain operation characteristics). The system may then merge this distribution with existing predictions (e.g., based on a machine learning model trained on historical data) to balance between historical and dynamically updated information. For example, the system may generate a recommendation that is a balance between a model based on historical predictions ("model predictions" or a "distribution of probable confirmation percentile") and dynamically updated information (e.g., dynamic blockchain operation characteristics, such as a base fee).

Figure 7:
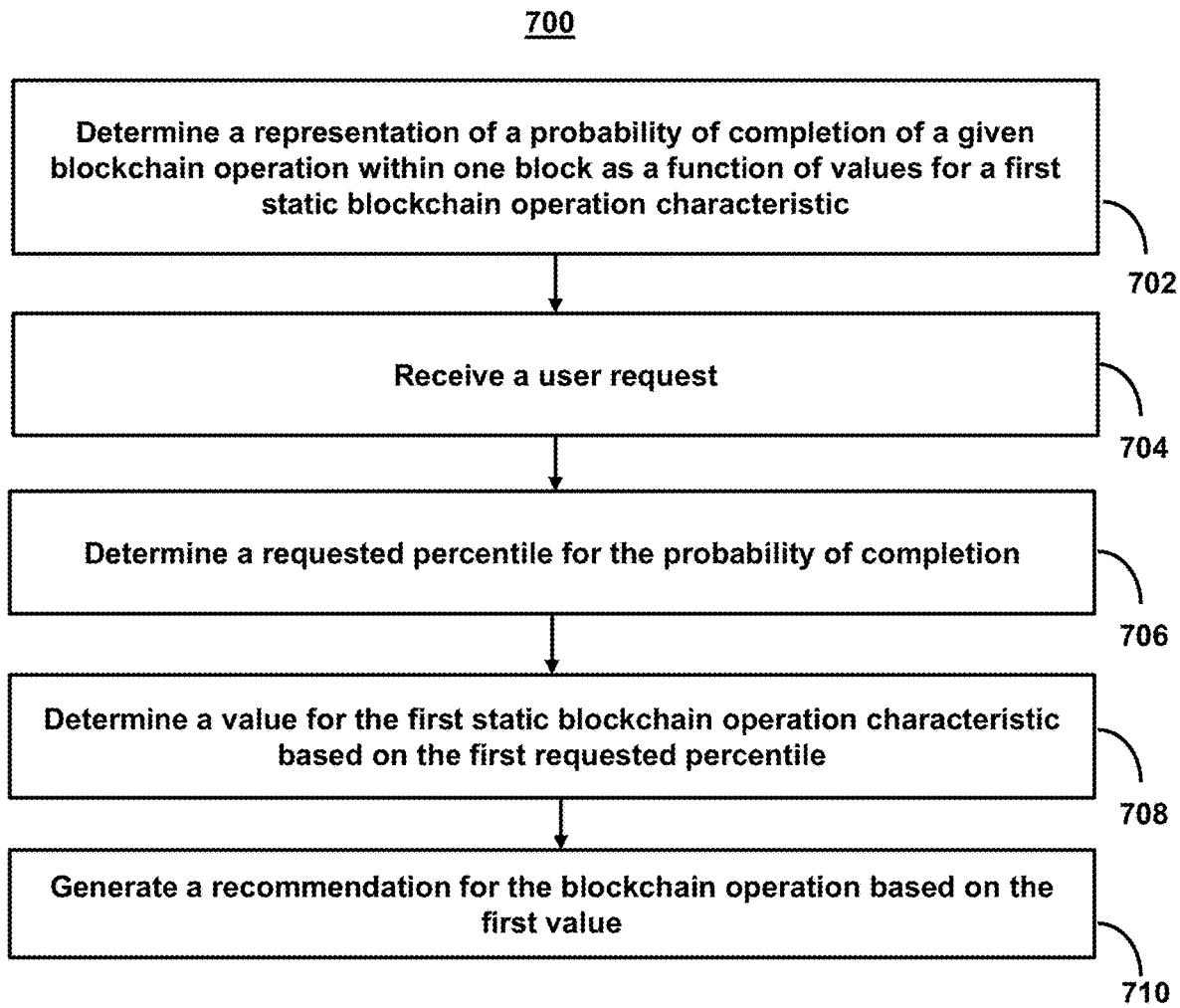
FIG. 7 shows a flowchart of the steps involved in facilitating blockchain operations, in accordance with one or more embodiments.

FIG. 7 shows a flowchart of the steps involved in facilitating blockchain operations, in accordance with one or more embodiments. For example, the system may use process 600 (e.g., as implemented on one or more system components described above) in order to facilitate blockchain operations.

At step 702, process 700 (e.g., using one or more components described above) determines a representation of a probability of completion of a given blockchain operation within one block as a function of values for a first static blockchain operation characteristic. For example, the system may generate a representation about the confirmation probability of a blockchain operation by collecting blockchain operation characteristics about previously completed (or failed) blockchain operations. For example, as described in FIGS. 6A-6B, the system may generate a representation for confirmation percentiles and blockchain operation characteristics. The system may use the representation to: identify a correlation between a confirmation percentile and blockchain operation characteristics; generate a similar confirmation percentile for a given blockchain operation (or blockchain operation characteristic); and/or determine a number of available blockchain operations for target confirmation percentile.

In some embodiments, the system may determine a first plurality of values for a first type of static blockchain operation characteristic, wherein each value of the first plurality of values for the first type of static blockchain operation characteristic corresponds to a respective blockchain operation of a first plurality of blockchain operations that was completed within one block of a blockchain network during a first time period. Additionally, or alternatively, the system may determine a second plurality of values for the first type of static blockchain operation characteristic, wherein each value of the second plurality of values for the first type of static blockchain operation characteristic corresponds to a respective blockchain operation of a second plurality of blockchain operations that was not completed within one block of the blockchain network during the first time period. Based on the first plurality of values and the second plurality of values, the system may determine a first representation, wherein the first representation of a probability of completion of a given blockchain operation within one block as a function of values for the first static blockchain operation characteristic.

In some embodiments, the system may record information about previous blockchain operations. For example, the system may record the first plurality of blockchain operations in a blockchain indexing application. The system may record the second plurality of blockchain operations in the blockchain indexing application. The system may parse the blockchain indexing application to determine the first plurality of values and the second plurality of values.

In some embodiments, the system may generate a representation that is specific to a time period. For example, the system may determine a third plurality of values for the first type of static blockchain operation characteristic, wherein each value of the third plurality of values for the first type of static blockchain operation characteristic corresponds to a respective blockchain operation of a third plurality of blockchain operations that was completed within one block of the blockchain network during a second time period. The system may then determine a fourth plurality of values for the first type of static blockchain operation characteristic, wherein each value of the fourth plurality of values for the first type of static blockchain operation characteristic corresponds to a respective blockchain operation of a fourth plurality of blockchain operations that was not completed within one block of the blockchain network during the second time period.

In some embodiments, the system may use a comparison of multiple representations for different time periods to determine blockchain operation characteristics. For example, the system may determine whether an average rate of change of a given static blockchain operation is increasing or decreasing and may make recommendations based on the average. For example, the system may determine the composite value based on the first value, and the second value further comprises determining a rate of change in the first value and the second value.

In some embodiments, the system may also use other information, such as key dates (e.g., dates indicating market closures, holidays, weekends, etc., that may affect network congestion) and/or off-chain information (e.g., indicating the occurrence of a given event) to determine recommendations and/or values of static blockchain operation characteristics. For example, the system may determine an off-chain characteristic (e.g., whether or not the current date corresponds to a holiday) and the system may select the first time period from a plurality of time periods based on the off-chain characteristic (e.g., select a time period that also corresponds to a holiday).

At step 704, process 700 (e.g., using one or more components described above) receives a user request. For example, the system may receive a user request to perform a blockchain operation (e.g., via user interface 100 (FIG. 1)). In some embodiments, the system may perform the user request using a specified digital wallet and/or signing protocol. For example, the system may access a user account corresponding to a public key in response to receiving the user request, wherein a first cryptography-based storage application corresponds to the user account that is accessible to a user device through a platform application, and wherein the first cryptography-based storage application is used to perform a plurality of blockchain operations. The system may retrieve a first partial private key and a user address from the user account. The system may query the user device for use of a second partial private key in performing the blockchain operation. The system may generate a first digital signature based on the first partial private key and the second partial private key. The system may perform the blockchain operation based on the first digital signature and the user address.

At step 706, process 700 (e.g., using one or more components described above) determines a requested percentile for the probability of completion. For example, the system may receive a user input (e.g., via user interface 100 (FIG. 1)) indicating a priority designation for a pending blockchain operation. The system may then determine a percentile based on the priority designation. For example, the system may receive a user input comprising a priority designation for the blockchain operation, wherein the first requested percentile is based on the priority designation.

At step 708, process 700 (e.g., using one or more components described above) determines a value for the first static blockchain operation characteristic based on the first requested percentile. For example, the system may determine, based on the first representation, a first value for the first static blockchain operation characteristic (e.g., a miner's fee) based on the first requested percentile. For example, the system may determine a value that corresponds to a given percentile of completion.

In some embodiments, the system may use the value to generate a dynamic gas range. For example, the system may determine a dynamic blockchain operation characteristic based on a current state of a blockchain network, wherein a static blockchain operation characteristic is not based on the current state of the blockchain network. The system may determine a dynamic gas range for executing the blockchain operation based on the dynamic blockchain operation characteristic and the first value. For example, the system may generate a dynamic gas range by combining a dynamic blockchain operation characteristic with the first value by: determining a range for the dynamic blockchain operation characteristic; generating a lowerbound of the dynamic gas range by summing the first value with a lowerbound of the range; and generating an upperbound of the dynamic gas range by summing the first value with an upperbound of the range.

At step 710, process 700 (e.g., using one or more components described above) generates a recommendation for the blockchain operation based on the first value. For example, the system may generate for display, on a user interface, a first recommendation for the blockchain operation based on the first value. In some embodiments, the system may generate multiple recommendations (e.g., as shown in FIG. 1). For example, the system may receive a second requested percentile for the probability of completion. The system may determine, based on the first representation, a second value for the first static blockchain operation characteristic based on the second requested percentile. The system may generate for display, on the user interface, simultaneously with the first recommendation, a second recommendation for the blockchain operation based on the second value.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: determining a first plurality of values for a first type of static blockchain operation characteristic, wherein each value of the first plurality of values for the first type of static blockchain operation characteristic corresponds to a respective blockchain operation of a first plurality of blockchain operations that was completed within one block of a blockchain network during a first time period; determining a second plurality of values for the first type of static blockchain operation characteristic, wherein each value of the second plurality of values for the first type of static blockchain operation characteristic corresponds to a respective blockchain operation of a second plurality of blockchain operations that was not completed within one block of the blockchain network during the first time period; based on the first plurality of values and the second plurality of values, determining a first representation, wherein the first representation of a probability of completion of a given blockchain operation within one block is a function of values for the first static blockchain operation characteristic; receiving a user request to perform a blockchain operation; determining a first requested percentile for the probability of completion; determining, based on the first representation, a first value for the first static blockchain operation characteristic based on the first requested percentile; and generating for display, on a user interface, a first recommendation for the blockchain operation based on the first value.

2. The method of any one of the preceding embodiments, wherein the method is for facilitating blockchain operations based on network congestion.

3. The method of any one of the preceding embodiments, further comprising: receiving a second requested percentile for the probability of completion; determining, based on the first representation, a second value for the first static blockchain operation characteristic based on the second requested percentile; and generating for display, on the user interface, simultaneously with the first recommendation, a second recommendation for the blockchain operation based on the second value.

4. The method of any one of the preceding embodiments, further comprising: recording the first plurality of blockchain operations in a blockchain indexing application; recording the second plurality of blockchain operations in the blockchain indexing application; and parsing the blockchain indexing application to determine the first plurality of values and the second plurality of values.

5. The method of any one of the preceding embodiments, further comprising: determining a third plurality of values for the first type of static blockchain operation characteristic, wherein each value of the third plurality of values for the first type of static blockchain operation characteristic corresponds to a respective blockchain operation of a third plurality of blockchain operations that was completed within one block of the blockchain network during a second time period; determining a fourth plurality of values for the first type of static blockchain operation characteristic, wherein each value of the fourth plurality of values for the first type of static blockchain operation characteristic corresponds to a respective blockchain operation of a fourth plurality of blockchain operations that was not completed within one block of the blockchain network during the second time period; based on the third plurality of values and the fourth plurality of values, determining a second representation; determining, based on the second representation, a second value for the first static blockchain operation characteristic based on the first requested percentile; determining a composite value based on the first value and the second value; and generating for display, on the user interface, a second recommendation for the blockchain operation based on the composite value.

6. The method of any one of the preceding embodiments, comprising determining a composite value based on the first value and the second value, further comprising determining a rate of change in the first value and the second value.

7. The method of any one of the preceding embodiments, further comprising: determining an off-chain characteristic; and selecting the first time period from a plurality of time periods based on the off-chain characteristic.

8. The method of any one of the preceding embodiments, further comprising: determining a dynamic blockchain operation characteristic based on a current state of a blockchain network, wherein a static blockchain operation characteristic is not based on the current state of the blockchain network; and determining a dynamic gas range for executing the blockchain operation based on the dynamic blockchain operation characteristic and the first value.

9. The method of any one of the preceding embodiments, further comprising receiving a user input comprising a priority designation for the blockchain operation, wherein the first requested percentile is based on the priority designation.

10. The method of any one of the preceding embodiments, further comprising: generating a dynamic gas range by combining a dynamic blockchain operation characteristic with the first value by: determining a range for the dynamic blockchain operation characteristic; generating a lowerbound of the dynamic gas range by summing the first value with a lowerbound of the range; and generating an upperbound of the dynamic gas range by summing the first value with an upperbound of the range.

11. The method of any one of the preceding embodiments, further comprising: accessing a user account corresponding to a public key in response to receiving the user request, wherein a first cryptography-based storage application corresponds to the user account that is accessible to a user device through a platform application, and wherein the first cryptography-based storage application is used to perform a plurality of blockchain operations; retrieving, from the user account, a first partial private key and a user address; querying the user device for use of a second partial private key in performing the blockchain operation; generating a first digital signature based on the first partial private key and the second partial private key; and performing the blockchain operation based on the first digital signature and the user address.

12. A tangible, non-transitory, machine-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system of facilitating blockchain operations based on network congestion, the system comprising:
   one or more processors and media storing instructions that, when executed by the one or more processors, cause operations comprising:
   determining, for a blockchain operation type, a set of congestion values comprising (i) first values respectively corresponding to blockchain operations that were completed within one block of a blockchain during a first time period, (ii) second values respectively corresponding to blockchain operations that were not completed within one block of the blockchain during the first time period; (iii) third values respectively corresponding to blockchain operations that were completed within one block of the blockchain during a second time period, (ii) fourth values respectively corresponding to blockchain operations that were not completed within one block of the blockchain during the second time period;
   based on the first values and the second values of the set of congestion values with respect to the first time period, determining a first representation indicating a first probability of completion of a given blockchain operation within one block as a function of values for the blockchain operation type,
   based on the third values and the fourth values of the set of congestion values with respect to the second time period, determining a second representation indicating a second probability of completion of a given blockchain operation within one block as a function of values for the blockchain operation type;
   in connection with receiving a user request to perform a blockchain operation corresponding to the blockchain operation type, determining (i) a first network resource amount for the blockchain operation type based on a first requested percentile for the blockchain operation type and the first representation indicating the first probability of completion and (ii) a second network resource amount for the blockchain operation type based on a second requested percentile for the blockchain operation type and the second representation indicating the second probability of completion; and
   generating for display, on a user interface, a recommendation for the blockchain operation based on a composite value derived from the first and second network resource amounts for the blockchain operation type.

2. A method of facilitating blockchain operations based on network congestion, the method comprising:
   determining, for a blockchain operation type, a set of congestion values comprising (i) first values respectively corresponding to blockchain operations that were completed within one block of a blockchain during a first time period and (ii) second values respectively corresponding to blockchain operations that were not completed within one block of the blockchain during the first time period;
   based on the first values and the second values of the set of congestion values, determining a first representation that indicates one or more probabilities of completion of a given blockchain operation within one block as a function of values for the blockchain operation type;
   in connection with receiving a user request to perform a blockchain operation corresponding to the blockchain operation type, determining a first requested percentile, and determining a first network resource amount for the blockchain operation type based on the first requested percentile and the first representation indicating the one or more probabilities of completion; and
   generating for display, on a user interface, a first recommendation for the blockchain operation based on the first network resource amount for the blockchain operation type.

3. The method of claim 2, further comprising:
   determining, based on (i) a second requested percentile for the blockchain operation type and (ii) the first representation indicating the one or more probabilities, a second network resource amount for the blockchain operation type; and
   generating for display, on the user interface, simultaneously with the first recommendation, a second recommendation for the blockchain operation based on the second network resource amount for the blockchain operation type.

4. The method of claim 2, further comprising:
   recording the blockchain operations corresponding to the first values of the set of congestion values and the blockchain operations corresponding to the second values of the set of congestion values in a blockchain indexing application; and
   parsing the blockchain indexing application to determine the first and second values of the set of congestion values.

5. The method of claim 2, further comprising:

determining, for the blockchain operation type, (i) third values respectively corresponding to blockchain operations that were completed within one block of the blockchain during a second time period and (ii) fourth values respectively corresponding to blockchain operations that were not completed within one block of the blockchain during the second time period;

based on the third values and the fourth values, determining a second representation indicating a second probability of completion of a given blockchain operation within one block as a function of values for the blockchain operation type;

determining a second network resource amount for the blockchain operation type based on the first requested percentile for the blockchain operation type and the second representation indicating the second probability of completion;

determining a composite value based on the first network resource amount and the second network resource amount; and generating for display, on the user interface, a second recommendation for the blockchain operation based on the composite value.

6. The method of claim 5, wherein determining the composite value comprises determining a rate of change in the first network resource amount and the second network resource amount.

7. The method of claim 2, further comprising:
in connection with the determination of the first representation indicating the one or more probabilities of completion, selecting the first time period from a plurality of time periods based on an off-chain characteristic such that the first time period corresponds to the off-chain characteristic.

8. The method of claim 2, further comprising:
determining a dynamic blockchain operation characteristic based on a current state of a blockchain network; and
determining a dynamic gas range for executing the blockchain operation based on the dynamic blockchain operation characteristic and the first network resource amount.

9. The method of claim 2, further comprising receiving a user input comprising a priority designation for the blockchain operation, wherein the first requested percentile is based on the priority designation.

10. The method of claim 2, further comprising:
generating a dynamic gas range by combining a dynamic blockchain operation characteristic with the first network resource amount by:
determining a range for the dynamic blockchain operation characteristic;
generating a lowerbound of the dynamic gas range by summing the first network resource amount with a lowerbound of the range; and
generating an upperbound of the dynamic gas range by summing the first network resource amount with an upperbound of the range.

11. The method of claim 2, further comprising:
accessing a user account corresponding to a public key in response to receiving the user request, wherein a first cryptography-based storage application corresponds to the user account that is accessible to a user device through a platform application, and wherein the first cryptography-based storage application is used to perform a plurality of blockchain operations;
retrieving, from the user account, a first partial private key and a user address;
querying the user device for use of a second partial private key in performing the blockchain operation;
generating a first digital signature based on the first partial private key and the second partial private key; and
performing the blockchain operation based on the first digital signature and the user address.

12. One or more non-transitory, computer-readable media comprising instructions that, when executed by one or more processors, cause operations comprising:
determining, for a blockchain operation type, a set of congestion values comprising (i) first values respectively corresponding to blockchain operations that were completed within one block of a blockchain during a first time period and (ii) second values respectively corresponding to blockchain operations that were not completed within one block of the blockchain during the first time period;
based on the first values and the second values of the set of congestion values, determining a first representation that indicates one or more probabilities of completion of a given blockchain operation within one block as a function of values for the blockchain operation type;
in connection with receiving a user request to perform a blockchain operation corresponding to the blockchain operation type, determining a first requested percentile, and determining a first network resource amount for the blockchain operation type based on the first requested percentile and the first representation indicating the one or more probabilities of completion; and
generating for display, on a user interface, a first recommendation for the blockchain operation based on the first network resource amount for the blockchain operation type.

13. The one or more non-transitory, computer-readable media of claim 12, wherein the instructions further cause operations comprising:
determining, based on (i) a second requested percentile for the blockchain operation type and (ii) the first representation indicating the one or more probabilities, a second network resource amount for the blockchain operation type; and
generating for display, on the user interface, simultaneously with the first recommendation, a second recommendation for the blockchain operation based on the second network resource amount for the blockchain operation type.

14. The one or more non-transitory, computer-readable media of claim 12, wherein the instructions further cause operations comprising:
recording the blockchain operations corresponding to the first values of the set of congestion values and the blockchain operations corresponding to the second values of the set of congestion values in a blockchain indexing application; and
parsing the blockchain indexing application to determine the first and second values of the set of congestion values.

15. The one or more non-transitory, computer-readable media of claim 12, wherein the instructions further cause operations comprising:
determining, for the blockchain operation type, (i) third values respectively corresponding to blockchain operations that were completed within one block of the blockchain during a second time period and (ii) fourth values respectively corresponding to blockchain operations that were not completed within one block of the blockchain during the second time period;

based on the third values and the fourth values, determining a second representation indicating a second probability of completion of a given blockchain operation within one block as a function of values for the blockchain operation type;

determining a second network resource amount for the blockchain operation type based on the first requested percentile for the blockchain operation type and the second representation indicating the second probability of completion;

determining a composite value based on the first network resource amount and the second network resource amount; and generating for display, on the user interface, a second recommendation for the blockchain operation based on the composite value.

16. The one or more non-transitory, computer-readable media of claim 15, wherein determining the composite value comprises determining a rate of change in the first network resource amount and the second network resource amount.

17. The one or more non-transitory, computer-readable media of claim 12, wherein the instructions further cause operations comprising:

in connection with the determination of the first representation indicating the one or more probabilities of completion, selecting the first time period from a plurality of time periods based on an off-chain characteristic such that the first time period corresponds to the off-chain characteristic.

18. The one or more non-transitory, computer-readable media of claim 12, wherein the instructions further cause operations comprising:

determining a dynamic blockchain operation characteristic based on a current state of a blockchain network; and determining a dynamic gas range for executing the blockchain operation based on the dynamic blockchain operation characteristic and the first network resource amount.

19. The one or more non-transitory, computer-readable media of claim 12, wherein the instructions further cause operations comprising receiving a user input comprising a priority designation for the blockchain operation, wherein the first requested percentile is based on the priority designation.

20. The one or more non-transitory, computer-readable media of claim 12, wherein the instructions further cause operations comprising:

generating a dynamic gas range by combining a dynamic blockchain operation characteristic with the first network resource amount by:

determining a range for the dynamic blockchain operation characteristic;

generating a lowerbound of the dynamic gas range by summing the first network resource amount with a lowerbound of the range; and generating an upperbound of the dynamic gas range by summing the first network resource amount with an upperbound of the range.

* * * * *